M. HARREL.
SIEVE.
APPLICATION FILED JUNE 16, 1913.
1,086,596.
Patented Feb. 10, 1914.
2 SHEETS—SHEET 2.
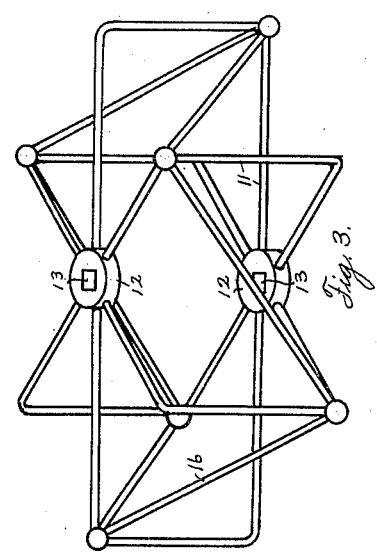
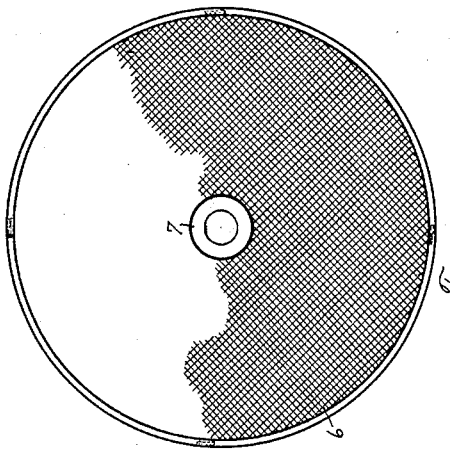
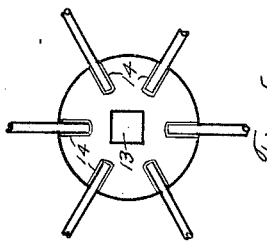
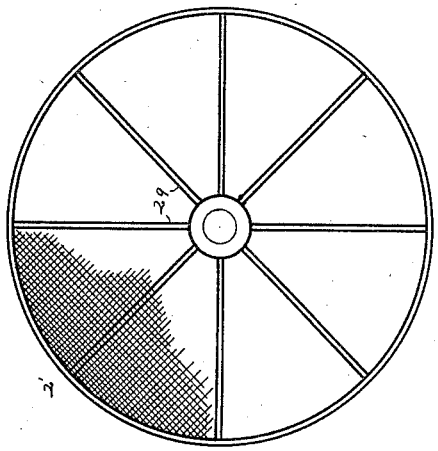
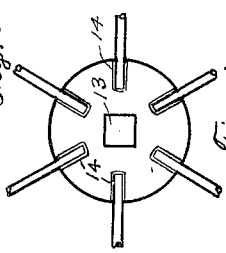
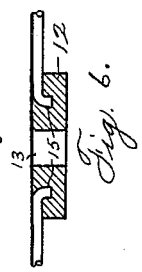
WITNESSES:
C Baylor Huie
May Montgomery
INVENTOR
Mary Harrel
BY
Hardway & Cathey
ATTORNEYS.

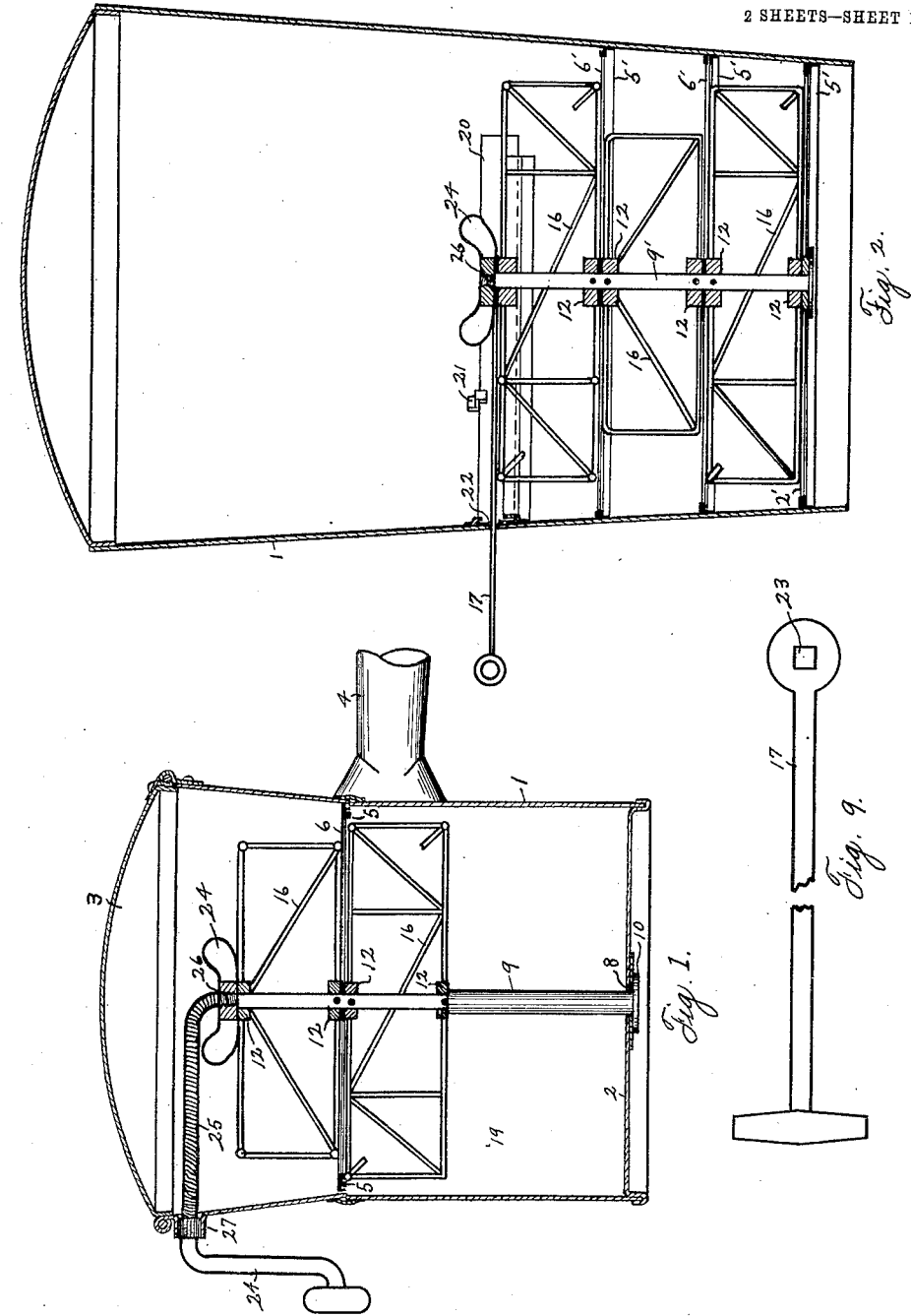

UNITED STATES PATENT OFFICE.

MARY HARREL, OF HOUSTON, TEXAS.

SIEVE.

1,086,596. Specification of Letters Patent. Patented Feb. 10, 1914.

Application filed June 16, 1913. Serial No. 773,955.

*To all whom it may concern:*

Be it known that I, MARY HARREL, a citizen of the United States, residing at Houston, in the county of Harris and State of Texas, have invented certain new and useful Improvements in Sieves, of which the following is a specification.

This invention relates to new and useful improvements in sieves.

The object of the invention is to provide a utensil of the character described, to be used in sifting flour and meal. In baking, it is well known that the more the flour is sifted and stirred, the lighter will be the bread or cake made therefrom, as more air will be distributed through the flour which will expand in baking and result in a lighter baked product.

It is the object of this invention to provide a sieve whereby the flour or meal may be easily sifted a number of times with the result that it will be thoroughly permeated with air before it is prepared for baking.

With the above and other objects in view, the invention has particular relation to certain novel features of construction, operation and arrangement of parts, an example of which is given in this specification, and illustrated in the accompanying drawings, wherein—

Figure 1 is a side elevation of one form of the sieve with the near wall removed so as to show the working parts. Fig. 2 is a side elevation of another form thereof. Fig. 3 is a perspective view of one of the spiders used in connection therewith. Figs. 4 and 5 show fragmentary plan views of the hub portion of said spider. Fig. 6 is a sectional side elevation of the hub of said spider. Fig. 7 is a plan view of one of the riddles used in said sieve. Fig. 8 is a plan view of the bottom riddle used in the form of sieve shown in Fig. 2, and Fig. 9 shows a plan view of the shaker.

Referring now more particularly to the drawings wherein like numerals of reference designate similar parts in each of the figures, first referring to Fig. 1, the numeral 1 refers to a receptacle, usually made out of tin or sheet material and substantially cylindrical in form but flaring slightly from the bottom to the top and having a fixed bottom 2 and a covering 3 hinged thereto so as to be readily opened and closed. This receptacle has a fixed handle 4 by means of which it may be held in any desired position. An annular shoulder 5 extends around the inner wall of the receptacle, approximately midway between the top and bottom and upon this shoulder rests the riddle 6 which is detachably secured to said shoulder so it will not rotate and is formed of wire mesh work in the well known manner and having a central bearing 7. The bottom 2 has a central bearing 8 through which projects the shaft 9, the upper portion of which is reduced and formed square and the lower end of which carries a circular plate 10 which fits up closely against the bottom 2.

The numeral 11 designates a spider having two alined hubs 12, 12 with square orifices 13, 13 therethrough which receive the square portion of the shaft 9 which fits snugly therein. Each spider has a plurality of, preferably six, wings, as shown in Figs. 4 and 5, which radiate therefrom. Each wing is formed of a U-shaped wire whose free ends are attached to the hubs 12, 12, as shown in Figs. 4, 5 and 6.

The outer faces of the hubs 12, 12 have radiating grooves 14 from the inner ends of which extend the recesses 15 and the free ends of the wings of which the spider is formed rest in the grooves 14 and have their extreme ends turned inwardly so as to engage in the recesses 15, said free ends of said wings being soldered in position and the outer ends of the wings are braced by means of the wire 16 which passes entirely around the spider and is soldered to the outer ends of the wings, and extends diagonally back and forth from one side of one wing to the opposite side of the succeeding wing.

The numeral 17 designates a shaker for a purpose to be hereinafter explained.

An oblong slot 18 is cut in the side of the receptacle 1 and immediately beneath this slot, on the inside of the receptacle and secured to the receptacle wall is a guide 19 in which an oblong arcuate plate 20 slides. The upper edge of this plate 20 is held firmly against the receptacle wall by means of guides 21. The plate 20 has an orifice 22 therethrough alined with the slot 18 through which the shaker 17 extends. As the shaker is moved back and forth, as will be hereinafter described, the plate 20 slides back and forth therewith and is of sufficient length to at all times close the slot 18 and prevent the passage of the contents of the receptacle therethrough.

The device shown in Fig. 1 is assembled as follows:—The shaft 9 is first inserted through the bearing 8 in the bottom 2 and in case the shaker 17 is used it is passed through the slot 18 and the orifice 22 and the free end of the shaft 9 is passed through the square orifice 23 in the inner end of the shaker 17 in which orifice said shaft snugly fits. The spider 11 is then placed in position, the square portion of the shaft 9 passing through the orifices 13 13 thereof. The riddle 6 is next placed in position, the upper end of the shaft 9 passing through the central bearing 7 thereof and the rim of said riddle resting upon the annular shoulder 5. Another spider is then placed in position upon the shaft 9 and above the riddle 6, as shown in Fig. 1 and secured thereon by means of the thumb screw 24 which is screwed on the upper end of the shaft 9 and rests against the hub 12 of the upper spider.

It is to be noted that the wings of the spider above the riddle are arranged in staggered relation to the wings of the spider underneath the riddle. When the spiders are assembled on the shaft, the flour to be sifted is poured into the upper portion of the receptacle, falling upon the riddle 6 and the covering 3 is then secured in position on the receptacle. The shaker 17 is then manipulated back and forth from end to end of the slot 18, which causes a partial rotation of the shaft 9 and the spider 11 secured thereon in each direction. As the shaker 17 is moved back and forth, the plate 20 slides back and forth with it but at all times keeps the slot 18 closed, as hereinbefore explained. The spider above the riddle 6, as it is reciprocated back and forth, quickly forces the flour through the riddle into the bottom of the receptacle. When all of the flour has passed through the riddle, the position of the receptacle is reversed so that the top 3 will serve as the bottom and the operation continued until the flour is sifted back through the riddle 6. This process may be continued as long as desired.

The shaker 17 shown in Fig. 2 may be dispensed with and the shaft 9 rotated by means of the crank 24'. In case this method of operating the device is used, a flexible shaft 25 will be provided, the inner end of which has a threaded nipple 26 which is screwed into a corresponding socket in the thumb screw 24 and the other end of which is passed through the bearing 27 in the receptacle wall. The outer end of the flexible shaft 25 has a threaded nipple 28 which is screwed into a corresponding inwardly threaded socket in the inner end of the crank 24'. The rotation of the crank 24' is transmitted to the flexible shaft 25 and thence to the shaft 9 and to the spiders carried thereby. Either of the devices hereinbefore described may be used for operating the utensil, but if one is used the other must be dispensed with. In the form shown in Fig. 2, the bottom 2 has been removed and instead thereof a riddle 2' is used, formed of mesh wire suitably braced by small cross rods 29. Three annular shoulders 5', 5', 5' are provided which are secured to the receptacle wall and spaced a uniform distance apart, upon the lower one of which rests the riddle 2' and upon the other two of which rest the riddles 6', 6' which are similar to the riddle 6, shown in Fig. 7, and have central bearings for the reception of the shaft 9' which is in all respects similar to the shaft 9, except that it is square in cross section from end to end. In the form of device shown in Fig. 2, three spiders 11 are employed, in all respects similar to those employed in the form shown in Fig. 1. One of the spiders is arranged above the upper riddle 6', another between the riddles 6', 6' and another between the lower riddle 6' and the riddle 2'.

In case the form of device shown in Fig. 2 is used, the flour is first placed in the upper portion of the receptacle and the shaker 17 manipulated and the flour will gradually be sifted down through the successive riddles and fall into a pan or receptacle over which the sieve is held. One operation will be sufficient to properly prepare the flour when this form of sieve is used and the position thereof will not be reversed in operation as is the case with the form shown in Fig. 1.

It is to be observed that each part of this device is detachable from the other parts and in case one part should become worn out or broken, a new part can be readily substituted therefor without discarding the entire utensil.

While I have shown only two forms of this device, it is apparent that mechanical changes may be made therein without departing from the principle of the invention and I hereby reserve the right to make such mechanical changes therein as may be found desirable so long as I do not depart from the scope of the appended claims.

What I claim is:—

1. A device of the character described consisting of a receptacle, a plurality of transverse partitions formed of wire mesh arranged therein, a vertically extending rotatable shaft in said receptacle extending through said partition, a plurality of rotatable spiders fixed on said shaft, one arranged adjacent each partition on each side, each spider including two alined hubs and a plurality of wings radiating therefrom, each wing being formed of a U-shaped wire whose free ends are attached to the respective hubs, and means for rotating the shaft to which said spiders are fixed.

2. A device of the character described, consisting of a receptacle, a plurality of mesh partitions therein, said partitions being spaced apart, a vertically extending rotatable shaft in said receptacle extending axially therethrough and through the partitions therein, a plurality of rotatable spiders detachably secured to said shaft, one arranged adjacent each partition on each side, each spider including two alined hubs and a plurality of wings radiating therefrom, each wing being formed of a U-shaped wire whose free ends are attached to the respective hubs and a flexible shaft operatively connected with said vertical shaft for rotating the same.

3. A device of the character described consisting of a receptacle, a transverse partition formed of mesh work arranged therein, a plurality of rotatable spiders, one arranged above and the other below said partition, each spider including two alined hubs and a plurality of wings radiating therefrom, each wing being formed of a U-shaped wire whose free ends are attached to the respective hubs, a bracing wire passing entirely around the spider and secured to the outer ends of the wings and extending diagonally back and forth from one side of one wing to the opposite side of the succeeding wing, a rotatable shaft extending upwardly through said partition to which said spiders are fixed and means for rotating said shaft.

In testimony whereof I have signed my name to this specification in the presence of two subscribing witnesses.

MARY HARREL.

Witnesses:
  A. A. TOMLINSON,
  H. E. YOUNG.

---

Copies of this patent may be obtained for five cents each, by addressing the "Commissioner of Patents, Washington, D. C."